(12) United States Patent
Jiang et al.

(10) Patent No.: US 11,541,832 B2
(45) Date of Patent: Jan. 3, 2023

(54) VEHICLE BUS-BASED COMMUNICATION METHOD, APPARATUS AND COMPUTER DEVICE

(71) Applicant: AUTEL INTELLIGENT TECHNOLOGY CORP., LTD., Guangdong (CN)

(72) Inventors: Yun Jiang, Guangdong (CN); Songsong Qu, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 298 days.

(21) Appl. No.: 16/900,588

(22) Filed: Jun. 12, 2020

(65) Prior Publication Data
US 2020/0298774 A1    Sep. 24, 2020

Related U.S. Application Data

(63) Continuation of application No. PCT/CN2018/119574, filed on Dec. 6, 2018.

(30) Foreign Application Priority Data

Dec. 12, 2017 (CN) .......................... 201711320453.2

(51) Int. Cl.
*B60R 16/02* (2006.01)
*B60R 16/023* (2006.01)
(Continued)

(52) U.S. Cl.
CPC ...... *B60R 16/0231* (2013.01); *G06F 11/3013* (2013.01); *G06F 11/349* (2013.01);
(Continued)

(58) Field of Classification Search
CPC .......... G06F 11/30; G06F 11/34; G06F 13/20; H04L 12/40; B60R 16/123
See application file for complete search history.

(56) References Cited

U.S. PATENT DOCUMENTS

| 5,890,080 A | 3/1999 | Coverdill et al. |
| 10,635,109 B2 * | 4/2020 | Guo ..................... G05D 1/0212 |

(Continued)

FOREIGN PATENT DOCUMENTS

| CN | 101000711 A | 7/2007 |
| CN | 104114993 A | 10/2014 |

(Continued)

OTHER PUBLICATIONS

International Search Report dated Mar. 6, 2019; PCTCN2018/119574.

(Continued)

*Primary Examiner* — Henry Tsai
*Assistant Examiner* — Christopher A Daley

(57) ABSTRACT

The present invention provides a vehicle bus-based communication method and apparatus, a computer device and a storage medium. The vehicle bus-based communication method includes: monitoring data flows transmitted through a vehicle bus by vehicle electronic control units; determining undetected data flows in to-be-obtained data flows when the monitoring reaches a first time length; broadcasting data flow obtaining requests through the vehicle bus, the data flow obtaining requests specifying queries for the undetected data flows; and obtaining data flows that are fed back through the vehicle bus in response to the data flow obtaining requests. When data flows of a vehicle are obtained through a vehicle bus, data flows on the vehicle bus are first obtained in a monitoring manner, thereby ensuring data flow obtaining efficiency. After the monitoring is performed for a period of time, data flows that are not obtained in a moni- (Continued)

toring-and-obtaining manner are obtained by sending corresponding data flow obtaining requests to the vehicle bus, so that it is ensured that relatively more complete data flows of the vehicle can be obtained.

15 Claims, 6 Drawing Sheets

(51) Int. Cl.
  *G06F 11/30* (2006.01)
  *G06F 11/34* (2006.01)
  *G06F 13/20* (2006.01)
  *H04L 12/40* (2006.01)
  *G07C 5/00* (2006.01)
  *G07C 5/08* (2006.01)

(52) U.S. Cl.
  CPC ............. *G06F 13/20* (2013.01); *G07C 5/006* (2013.01); *G07C 5/0808* (2013.01); *H04L 12/40032* (2013.01); *H04L 2012/40273* (2013.01)

(56) References Cited

U.S. PATENT DOCUMENTS

2011/0084807 A1* 4/2011 Logan ................... H04W 4/029
                                                                340/10.1
2016/0133130 A1* 5/2016 Grimm ................ G08G 1/0129
                                                                340/905
2016/0203653 A1  7/2016 Liu et al.
2018/0232959 A1* 8/2018 Thornburg .......... H04L 43/0805
2018/0322783 A1* 11/2018 Toyoda ................. B60W 50/14
2019/0019423 A1* 1/2019 Choi ...................... G05D 1/106
2020/0145252 A1* 5/2020 Torisaki ................. H04L 12/46

FOREIGN PATENT DOCUMENTS

| CN | 104181839 A | 12/2014 |
| CN | 107065832 A | 8/2017 |
| CN | 108196967 A | 6/2018 |
| JP | 2005014743 A | 1/2005 |
| JP | 200870133 A | 3/2008 |

OTHER PUBLICATIONS

The First Chinese Office Action dated Mar. 28, 2019; Appln. No. 201711320453.2.
The Second Chinese Office Action dated Jan. 3, 2020; Appln. No. 201711320453.2.
Extended European Search Report dated Jan. 21, 2021; Appln. No. 18889679.9.

* cited by examiner

VEHICLE BUS-BASED COMMUNICATION METHOD, APPARATUS AND COMPUTER DEVICE

This application is a continuation application of International Application No. PCT/CN2018/119574, filed on Dec. 6, 2018, which claims priority of Chinese Patent Application No. 201711320453.2, filed on Dec. 12, 2017, which is incorporated herein by reference in its entirety.

BACKGROUND

Technical Field

The present application relates to the field of vehicle communications technologies, and in particular, to a vehicle bus-based communication method, an apparatus and a computer device.

Related Art

With rapid development of the vehicle industry, an automation degree of a vehicle becomes higher and higher, and there are more vehicles adopting an electronic control system. A quantity of electronic control units (ECUs) configured inside a vehicle gradually increases, and internal wiring of the vehicle also becomes more and more complex. To simplify circuitry, a plurality of ECUs inside the vehicle are connected in series into a network system through a data bus. A diagnostic device may obtain related data flows, such as operational parameters and configuration parameters of the vehicle and fault information of the vehicle, through the data bus.

Currently, obtaining, by the diagnostic device, the data flows of the vehicle is implemented in a manner of monitoring a vehicle bus. However, merely data flows that are actively sent by an ECU can be obtained in this manner. Consequently, the obtained data flows are limited.

SUMMARY

Based on this, for a current technical problem that data flows obtained by a diagnostic device are limited, it is necessary to provide a vehicle bus-based communication method, an apparatus, a computer device and a storage medium.

A vehicle bus-based communication method is provided, including:

monitoring data flows transmitted through a vehicle bus by vehicle ECUs;

determining undetected data flows in to-be-obtained data flows when the monitoring reaches a first time length;

broadcasting data flow obtaining requests through the vehicle bus, the data flow obtaining requests specifying queries for the undetected data flows; and obtaining data flows that are fed back through the vehicle bus in response to the data flow obtaining requests.

In an embodiment, the broadcasting data flow obtaining requests through the vehicle bus includes:

traversing the undetected data flows;

generating data flow obtaining requests corresponding to the traversed data flows in sequence, the generated data flow obtaining requests specifying queries for the corresponding traversed data flows; and broadcasting the generated data flow obtaining requests through the vehicle bus in sequence.

In an embodiment, the method further includes:

when a second time length is reached after the data flow obtaining requests are broadcast through the vehicle bus, determining, in the undetected data flows, data flows that are not obtained when the data flow obtaining requests are broadcast through the vehicle bus;

sending data flow query requests through the vehicle bus, the data flow query requests carrying physical addresses of vehicle ECUs corresponding to the data flows that are not obtained; and receiving data flows through the vehicle bus, the received data flows being fed back, in response to the data flow query requests, by the vehicle ECUs having the physical addresses.

In an embodiment, the sending data flow query requests through the vehicle bus includes:

traversing vehicle ECUs accessing the vehicle bus; and sending the data flow query requests to the traversed vehicle ECUs through the vehicle bus.

In an embodiment, the method further includes:

recording a corresponding obtaining manner as a monitoring-and-obtaining manner for the detected data flows;

recording a corresponding obtaining manner as a broadcasting-and-obtaining manner for the data flows that are obtained by broadcasting the data flow obtaining requests; and recording a corresponding obtaining manner as a directional obtaining manner for the data flows that are obtained by sending the data flow query requests carrying the physical addresses.

In an embodiment, the method further includes:

obtaining an instruction for refreshing and displaying a data flow;

obtaining a corresponding recorded obtaining manner of a data flow specified by the instruction for refreshing and displaying a data flow;

re-obtaining, in the corresponding recorded obtaining manner, the data flow specified by the instruction for refreshing and displaying a data flow; and displaying the re-obtained data flow.

A vehicle bus-based communications apparatus is provided, including:

a data flow monitoring module, configured to monitor data flows transmitted through a vehicle bus by vehicle ECUs;

a data flow determining module, configured to determine undetected data flows in to-be-obtained data flows when the monitoring reaches a first time length;

a data flow obtaining request broadcasting module, configured to broadcast data flow obtaining requests through the vehicle bus, the data flow obtaining requests specifying queries for the undetected data flows; and a data flow obtaining module, configured to obtain data flows that are fed back through the vehicle bus in response to the data flow obtaining requests.

In an embodiment, the apparatus further includes a data flow traversal module and a data flow obtaining request generation module, where the data flow traversal module is configured to traverse the undetected data flows;

the data flow obtaining request generation module is configured to generate data flow obtaining requests corresponding to the traversed data flows in sequence, the generated data flow obtaining requests specifying queries for the corresponding traversed data flows; and the data flow obtaining request broadcasting module is further configured to broadcast the generated data flow obtaining requests through the vehicle bus in sequence.

In an embodiment, the apparatus further includes a data flow query request sending module, where the data flow determining module is further configured to: when a second time length is reached after the data flow obtaining requests are broadcast through the vehicle bus, determine, in the undetected data flows, data flows that are not obtained when the data flow obtaining requests are broadcast through the vehicle bus;

the data flow query request sending module is configured to send data flow query requests through the vehicle bus, the data flow query requests carrying physical addresses of vehicle ECUs corresponding to the data flows that are not obtained; and the data flow obtaining module is further configured to receive data flows through the vehicle bus, the received data flows being fed back, in response to the data flow query requests, by the vehicle ECUs having the physical addresses.

In an embodiment, the apparatus further includes an ECU traversal module, where the ECU traversal module is configured to traverse vehicle ECUs accessing the vehicle bus; and the data flow query request sending module is further configured to send the data flow query requests to the traversed vehicle ECUs through the vehicle bus.

In an embodiment, the apparatus further includes an obtaining manner recording module, where the obtaining manner recording module is configured to record a corresponding obtaining manner as a monitoring-and-obtaining manner for the detected data flows;

the obtaining manner recording module is further configured to record a corresponding obtaining manner as a broadcasting-and-obtaining manner for the data flows that are obtained by broadcasting the data flow obtaining requests; and the obtaining manner recording module is further configured to record a corresponding obtaining manner as a directional obtaining manner for the data flows that are obtained by sending the data flow query requests carrying the physical addresses.

In an embodiment, the apparatus further includes an instruction obtaining module and a data flow display module, where the instruction obtaining module is configured to obtain an instruction for refreshing and displaying a data flow;

the data flow obtaining module is further configured to obtain a corresponding recorded obtaining manner of a data flow specified by the instruction for refreshing and displaying a data flow; and further configured to re-obtain, in the corresponding recorded obtaining manner, the data flow specified by the instruction for refreshing and displaying a data flow; and the data flow display module is configured to display the re-obtained data flow.

A computer device is provided, including a memory and a processor, the memory storing a computer program, the computer program, when executed by the processor, causing the processor to perform the following steps:

monitoring data flows transmitted through a vehicle bus by vehicle ECUs;

determining undetected data flows in to-be-obtained data flows when the monitoring reaches a first time length;

broadcasting data flow obtaining requests through the vehicle bus, the data flow obtaining requests specifying queries for the undetected data flows; and obtaining data flows that are fed back through the vehicle bus in response to the data flow obtaining requests.

A computer-readable storage medium is provided, storing a computer program, the computer program, when executed by the processor, causing the processor to perform the following steps:

monitoring data flows transmitted through a vehicle bus by vehicle ECUs;

determining undetected data flows in to-be-obtained data flows when the monitoring reaches a first time length;

broadcasting data flow obtaining requests through the vehicle bus, the data flow obtaining requests specifying queries for the undetected data flows; and obtaining data flows that are fed back through the vehicle bus in response to the data flow obtaining requests.

In the vehicle bus-based communication method, the apparatus, the computer device and the storage medium described above, when data flows of a vehicle are obtained through a vehicle bus, data flows on the vehicle bus are first obtained in a monitoring manner, thereby ensuring data flow obtaining efficiency. After the monitoring is performed for a period of time, data flows that are not obtained in a monitoring-and-obtaining manner are obtained by sending corresponding data flow obtaining requests to the vehicle bus, so that it is ensured that relatively more complete data flows of the vehicle can be obtained.

BRIEF DESCRIPTION OF THE DRAWINGS

FIG. 4b is a schematic flowchart of a specific processing process of broadcasting data flow obtaining requests through a vehicle bus in step S406 in FIG. 4a;

DETAILED DESCRIPTION

To make the objectives, technical solutions and advantages of the present invention clearer and more comprehensible, the following further describes the present invention in detail with reference to the accompanying drawings and embodiments. It should be understood that the specific embodiments described herein are merely used for explaining the present invention but are not intended to limit the present invention.

Figure 1:
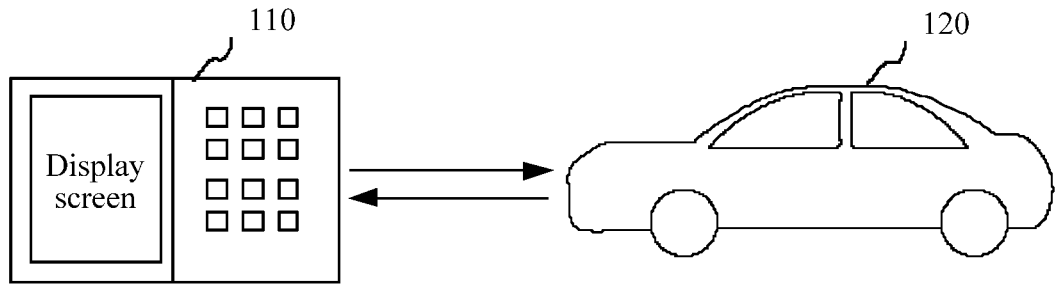
FIG. 1 is an application environment diagram of a vehicle bus-based communication method and an apparatus according to embodiments of the present invention.

FIG. 1 is an application environment diagram of a vehicle bus-based communication method and an apparatus according to embodiments of the present invention. Referring to FIG. 1, the vehicle bus-based communication method is applied to a vehicle bus-based communications system. The vehicle bus-based communications system includes a diagnostic device 110 and a vehicle 120. The diagnostic device 110 and the vehicle 120 are connected through a network. The diagnostic device 110 may specifically be a fixed device or a mobile device. The diagnostic device 110 is provided with a display screen, configured to feed diagnostic information output by the diagnostic device 110 back to a user.

Figure 2:
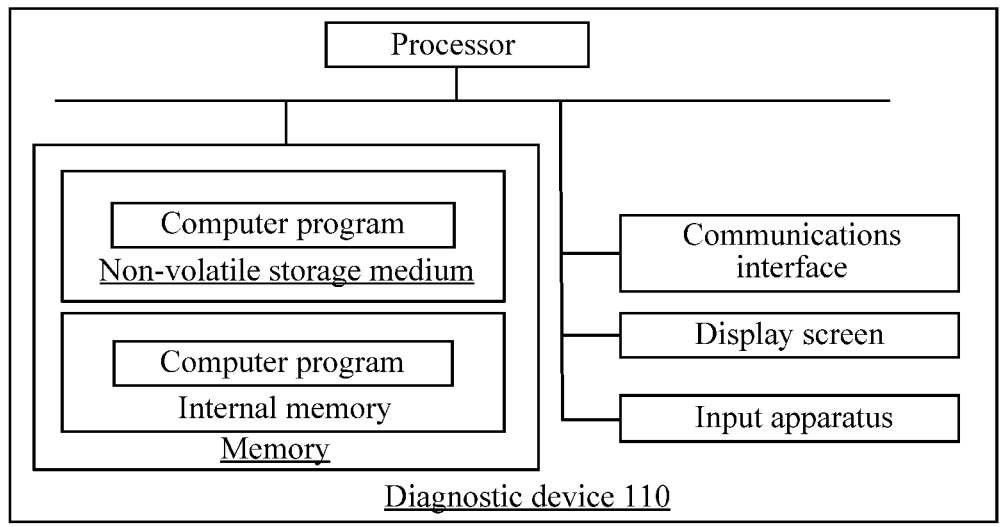
FIG. 2 is a schematic diagram of an internal structure of a diagnostic device 110 in FIG. 1.

FIG. 2 is a schematic diagram of an internal structure of the diagnostic device 110 in the application environment diagram in FIG. 1. The diagnostic device includes a processor, a memory, a communications interface, an input apparatus and a display screen that are connected through a system bus. The memory includes a non-volatile storage medium and an internal memory. The memory of the diagnostic device stores a computer program, the computer program, when executed by the processor, causing the processor to implement a vehicle bus-based communication method. The internal memory of the diagnostic device provides an environment for running of a computer program in the non-volatile storage medium. The processor is configured to provide computing and control capabilities, to support running of the entire diagnostic device. The communications interface of the diagnostic device is configured to communicate with a vehicle or an external terminal, for example, monitor and obtain data flows passing through a vehicle bus, and broadcast data flow obtaining requests through the vehicle bus. The display screen of the diagnostic device may be a liquid crystal display screen, an e-ink display screen, or the like. The input apparatus may be a touch layer covering the display screen, or may be a button, a trackball, or a touchpad disposed on a housing of the diagnostic device, or may be an external keyboard, a touchpad, a mouse or the like.

A person skilled in the art may understand that, the structure shown in FIG. 2 is merely a block diagram of a partial structure related to a solution of the present invention, and does not constitute a limitation to the diagnostic device to which the solution of the present invention is applied. Specifically, the diagnostic device may include more components or fewer components than those shown in the figure, or some components may be combined, or a different component deployment may be used.

Figure 3:
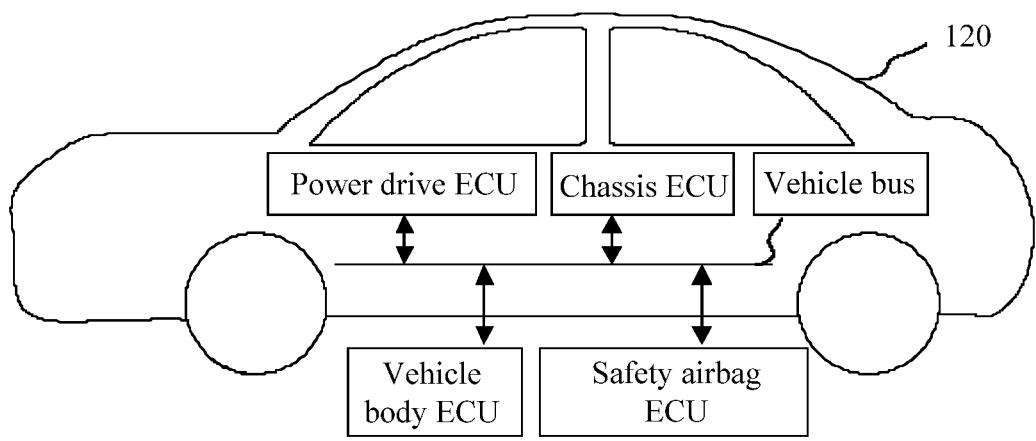
FIG. 3 is a schematic diagram of an internal structure of a vehicle 120 in FIG. 2.

FIG. 3 is a schematic diagram of an internal structure of a vehicle 120 in the application environment diagram in FIG. 1. The vehicle includes a power drive ECU, a chassis ECU, a vehicle body ECU, a safety airbag ECU and the like. An ECU, referred to as an electronic control unit, and also referred to as an in-vehicle computer or an on-board computer, is a microcomputer controller designated for vehicle use. The ECU includes a microprocessor, a memory, an input/output interface, an analog-to-digital converter and large-scale integrated circuits such as a shaping circuit and a driving circuit. A plurality of composition systems of the vehicle are all respectively provided with corresponding ECUs. Transmission and sharing of data flows between the ECUs are implemented through the vehicle bus.

A person skilled in the art may understand that, the structure shown in FIG. 3 is merely a block diagram of a partial structure related to a solution of the present invention, and does not constitute a limitation to the vehicle to which the solution of the present invention is applied. Specifically, the vehicle may include more components or fewer components than those shown in the figure, or some components may be combined, or a different component deployment may be used.

Figure 4A:
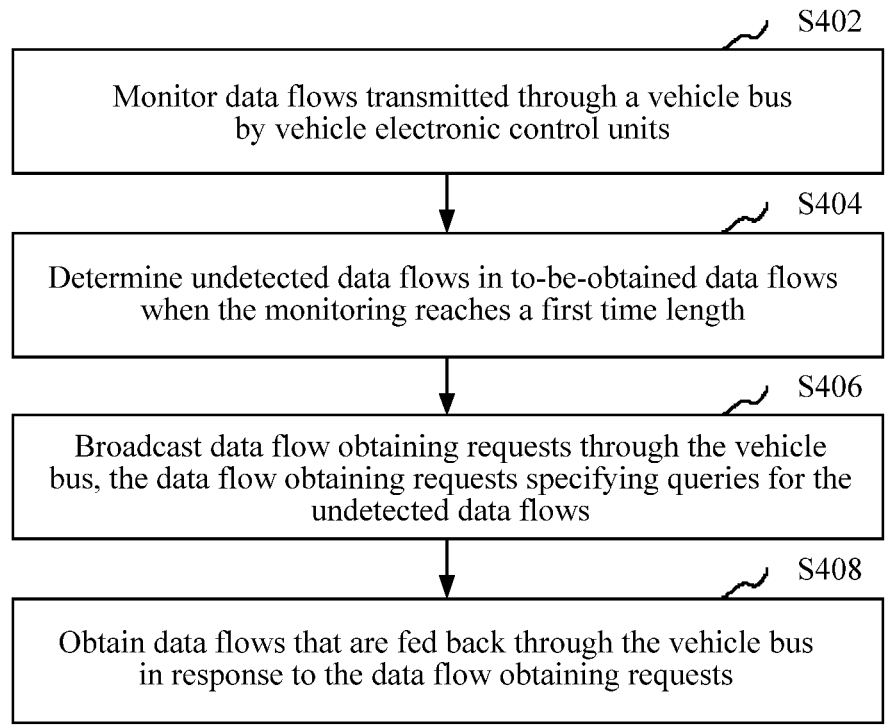
FIG. 4a is a schematic flowchart of a vehicle bus-based communication method according to an embodiment of the present invention.

FIG. 4a is a schematic flowchart of a vehicle bus-based communication method according to an embodiment of the present invention. The method includes steps S402 to S408. The following describes the steps in detail.

S402. Monitor data flows transmitted through a vehicle bus by vehicle ECUs.

The monitoring is to detect, in real time, data flows transmitted on a vehicle bus, to obtain detected data flows. An ECU is also referred to as an on-board computer, and is a control center of systems included in a vehicle. The vehicle bus implements a controller area network (CAN) of data sharing between the ECUs of the vehicle. The vehicle bus may specifically be a CAN bus, an RS485 bus, or may be another bus applicable to that: a diagnostic device communicates with a vehicle ECU through the vehicle bus. The data flows are serial data formed, through serial transmission of data wires, by a plurality of pieces of data that are generated through interaction between the ECU and a sensor.

Specifically, the vehicle ECU automatically sends data flows through the vehicle bus. The diagnostic device may monitor the data flows sent by the vehicle ECU by monitoring the vehicle bus. When detecting, on the vehicle bus, the data flows sent by the vehicle ECU, the diagnostic device obtains the detected data flows from the vehicle bus.

In an embodiment, the diagnostic device and the vehicle bus may communicate with each other through a diagnostic interface of the vehicle, or may monitor and obtain the data flows in a manner of wireless communication.

In an embodiment, after obtaining a detected data flow from the vehicle bus, the diagnostic device stores the data flow, and dynamically displays the data flow in real time, thereby rapidly refreshing and displaying the data flow, and improving display efficiency.

S404. Determine undetected data flows in to-be-obtained data flows when the monitoring reaches a first time length.

The first time length may be a preset time length. The first time length may specifically be a time length during which the diagnostic device monitors the vehicle bus, for example, 30 seconds. The to-be-obtained data flows are data flows specified in a vehicle communication protocol. The vehicle communication protocol is a standard of mutual communication between systems of the vehicle. The vehicle communication protocol may specifically be the J1939 protocol or the J1708 protocol.

Specifically, the diagnostic device may obtain from the vehicle bus, by monitoring the vehicle bus for a period of time, data flows that are actively sent by the vehicle ECU within the period of time. After the preset monitoring time length is reached, the diagnostic device determines a data flow that has not been obtained in the to-be-obtained data flows according to the obtained data flows and to-be-obtained data flows in the vehicle communication protocol.

S406. Broadcast data flow obtaining requests through the vehicle bus, the data flow obtaining requests specifying queries for the undetected data flows.

The broadcasting is a one-to-many data transmission manner. The broadcasting may specifically be a data sending manner in which the vehicle ECU receiving the data flow obtaining request is not specifically specified. Vehicle ECUs that receive the broadcast data flow obtaining request and that meet a corresponding requirement may all respond to the data flow obtaining request. The data flow obtaining request is a request used by the diagnostic device for querying for and obtaining a corresponding data flow from the vehicle ECU.

Specifically, the diagnostic device determines, in the to-be-obtained data flows, a data flow that is not obtained in a monitoring-and-obtaining manner, generates a corresponding data flow obtaining request according to the determined data flow that is not obtained, and broadcasts the generated data flow obtaining request through the vehicle bus in a broadcasting-and-obtaining manner, so that the vehicle ECU returns a corresponding data flow in response to the data flow obtaining request.

In an embodiment, the diagnostic device generates a broadcast packet according to the determined data flows. The broadcast packet is used for querying whether there is a vehicle ECU that correspondingly has the data flow. The broadcast packet includes information representing querying whether there is a vehicle ECU that correspondingly has the data flow. The information is encapsulated in the broadcast packet according to a preset format. The broadcast packet may be directly pushed to the vehicle ECUs through the vehicle bus. After receiving the broadcast packet, the vehicle ECU parses the broadcast packet, and if there is a corresponding data flow, feeds the data flow back to the diagnostic device through the vehicle bus. The data flow obtaining request for obtaining a data flow is pushed to the vehicle ECUs in a form of the broadcast packet, thereby improving data flow obtaining efficiency.

In an embodiment, the diagnostic device sends the generated data flow obtaining requests to the vehicle bus, and the vehicle ECUs actively obtain corresponding data flow obtaining requests from the vehicle bus according to requirements, and respond to the data flow obtaining requests. The active obtaining manner of the vehicle ECUs reduces a data volume of each vehicle ECU and improves a data processing capability.

S408. Obtain data flows that are fed back through the vehicle bus in response to the data flow obtaining requests.

Specifically, the data flow obtaining requests corresponding to the data flows that are not obtained are sent to the vehicle ECUs through the vehicle bus. After obtaining the data flow obtaining requests, the ECUs perform matching queries according to the data flow obtaining requests. When data flows corresponding to the obtained data flow obtaining requests are found through querying, the ECUs feed back the data flows corresponding to the data flow obtaining requests.

In an embodiment, after obtaining the data flow obtaining requests broadcast by the diagnostic device through the vehicle bus, the plurality of ECUs of the vehicle perform queries according to the obtained data flow obtaining requests, compare the data flows found through querying with a preset condition, and if the data flows found through querying meet the preset condition, refuse to feed back the data flows found through querying to the diagnostic device through the vehicle bus. The preset condition is a preset standard for determining whether to feed back the data flows found through querying. The preset condition may specifically be that a sending manner of the data flow obtaining request corresponding to a data flow is a broadcasting manner.

In the vehicle bus-based communication method described above, when data flows of a vehicle are obtained through a vehicle bus, data flows on the vehicle bus are first obtained in a monitoring manner, thereby ensuring data flow obtaining efficiency. After the monitoring is performed for a period of time, data flows that are not obtained in a monitoring-and-obtaining manner are obtained by sending corresponding data flow obtaining requests to the vehicle bus, so that it is ensured that relatively more complete data flows of the vehicle can be obtained.

In an embodiment, step S406 includes: traversing the undetected data flows; generating data flow obtaining requests corresponding to the traversed data flows in sequence, the generated data flow obtaining requests specifying queries for the corresponding traversed data flows; and broadcasting the generated data flow obtaining requests through the vehicle bus in sequence.

The traversing relates to all the undetected data flow. The traversing may be separately obtaining all the undetected data flows one by one in an active obtaining manner. Specifically, the diagnostic device determines, according to the to-be-obtained data flows, all the undetected data flows by monitoring the obtained data flows, generates corresponding data flow obtaining requests respectively for all the determined data flows in sequence, and then, broadcasts the generated data flow separately obtaining request through the vehicle bus.

In an embodiment, the diagnostic device generates corresponding data flow obtaining requests in sequence respectively according to the plurality of determined data flows that are not obtained, and sends the generated data flow obtaining requests to the vehicle ECUs in order in a form of broadcasting through the vehicle bus. After receiving the data flow obtaining requests, the vehicle ECUs query for corresponding data flows according to the obtained data flow obtaining requests. In addition, the diagnostic device receives data flows fed back by the vehicle ECUs for the data flow obtaining requests. The generated data flow obtaining requests are sent in a form of broadcasting, thereby improving response efficiency of the data flow obtaining requests, so that data flow obtaining efficiency is improved.

In an embodiment, the diagnostic device generates corresponding data flow obtaining requests respectively for the data flows that are not obtained, and sends the generated data flow obtaining requests to the vehicle ECUs through the vehicle bus until all the data flows are completely traversed and queried for by sending the data flow obtaining requests. When receiving the data flows that are fed back by the vehicle ECUs and that correspond to the data flow obtaining requests, the diagnostic device dynamically displays the received data flows in real time. Corresponding data flow obtaining requests are generated respectively according to the data flows that are not obtained, the generated data flow obtaining requests being sent to the vehicle ECUs in succession through the vehicle bus, the data flows fed back by the vehicle ECUs being received in real time, thereby improving a quantity of obtained data flows and obtaining efficiency.

Figure 4B:
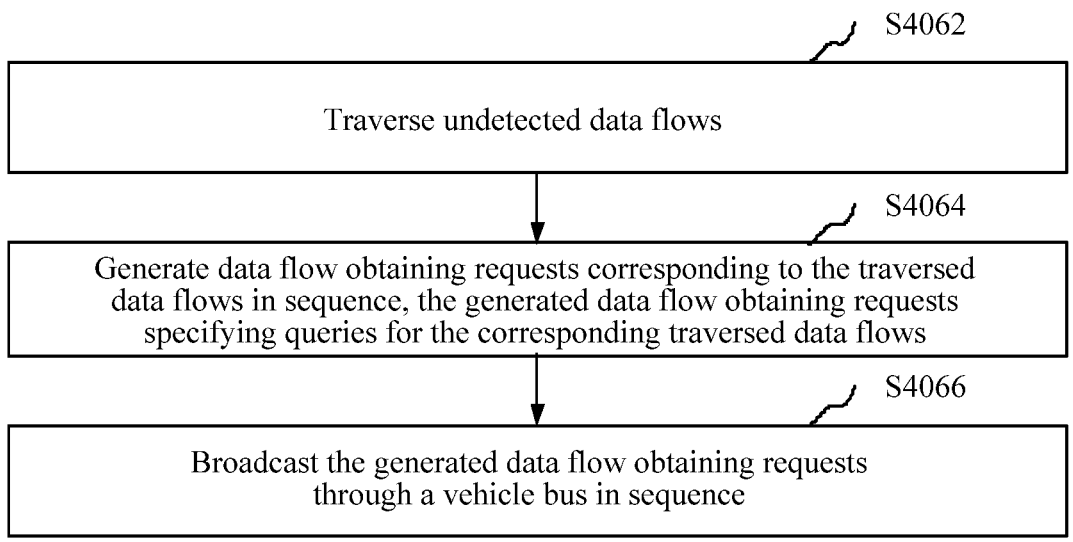

FIG. 4b is a schematic flowchart of a specific processing process of broadcasting data flow obtaining requests through the vehicle bus in step S406 in FIG. 4a. The specific processing process includes:

S4062. Traverse the undetected data flows.

S4064. Generate data flow obtaining requests corresponding to the traversed data flows in sequence, the generated data flow obtaining requests specifying queries for the corresponding traversed data flows.

S4066. Broadcast the generated data flow obtaining requests through the vehicle bus in sequence.

In the embodiment described above, corresponding data flow obtaining requests are generated respectively for all the undetected data flows, the generated data flow obtaining requests being broadcast through the vehicle bus, so that the vehicle ECUs respond to the obtained data flow obtaining requests. More complete data flows can be obtained by actively broadcasting the data flow obtaining requests.

In an embodiment, in the vehicle bus-based communication method described above, when a second time length is reached after the data flow obtaining requests are broadcast through the vehicle bus, data flows that are not obtained when the data flow obtaining requests are broadcast through the vehicle bus are determined in the undetected data flows; data flow query requests are sent through the vehicle bus, the data flow query requests carrying physical addresses of vehicle ECUs corresponding to the data flows that are not obtained; and data flows are received through the vehicle bus, the received data flows being fed back, in response to the data flow query requests, by the vehicle ECUs having the physical addresses.

The second time length may be a preset time length. The data flow query request is a request used by the diagnostic device for querying for and obtaining a corresponding data flow from the vehicle ECU. Physical addresses are addresses having one-to-one correspondences with the vehicle ECUs, and are used to uniquely identify the vehicle ECUs. The physical addresses may specifically be numbers and names of the vehicle ECUs.

Specifically, after respectively sending the data flow obtaining requests that are generated according to all the undetected data flows to the vehicle bus in a form of broadcasting, the diagnostic device waits for a period of time, to obtain data flows fed back by the vehicle ECUs in response to the data flow obtaining requests. The diagnostic device determines data flows that are still not obtained in the undetected data flows according to the determined undetected data flows described above and the received data flows that are fed back by the vehicle ECUs and correspond to the data flow obtaining requests. The diagnostic device queries for vehicle ECUs corresponding to the data flows and physical addresses corresponding to the vehicle ECUs according to the determined data flows that are not obtained. Subsequently, corresponding data flow query requests are generated according to the data flows and the physical addresses found through querying, the generated data flow query requests being sent to the vehicle ECUs corresponding to the physical addresses through the vehicle bus. After sending the data flow query requests, the diagnostic device receives, through the vehicle bus, data flows fed back by the vehicle ECUs corresponding to the physical addresses.

In an embodiment, after monitoring data flows of the vehicle bus and actively sending the data flow obtaining requests to the vehicle bus, the diagnostic device can determine, according to the obtained data flows, a quantity of vehicle ECUs included in the vehicle and physical addresses respectively corresponding to the vehicle ECUs.

In an embodiment, after determining, by broadcasting the data flow obtaining requests, data flows that are still not obtained in the undetected data flows, for each of the data flows that are not obtained, the diagnostic device respectively generates corresponding data flow query requests according to the determined physical addresses that respectively correspond to all the vehicle ECUs included in the vehicle and the data flows that are not obtained, and then, sends the generated data flow query requests to the vehicle ECUs. For data flows that are not obtained in either of two manners including monitoring the vehicle bus and broadcasting the data flow obtaining requests, corresponding data flow query requests are respectively generated according to the data flows that are not obtained and all vehicle ECUs included in the vehicle, the generated data flow query requests being sent, through the vehicle bus, to vehicle ECUs corresponding to the physical addresses, so that the vehicle ECUs feed back corresponding data flows in response to the data flow query requests. The three data flow obtaining manners not only can improve data flow obtaining efficiency, but also can ensure completely obtaining data flows of the vehicle.

Figure 4C:
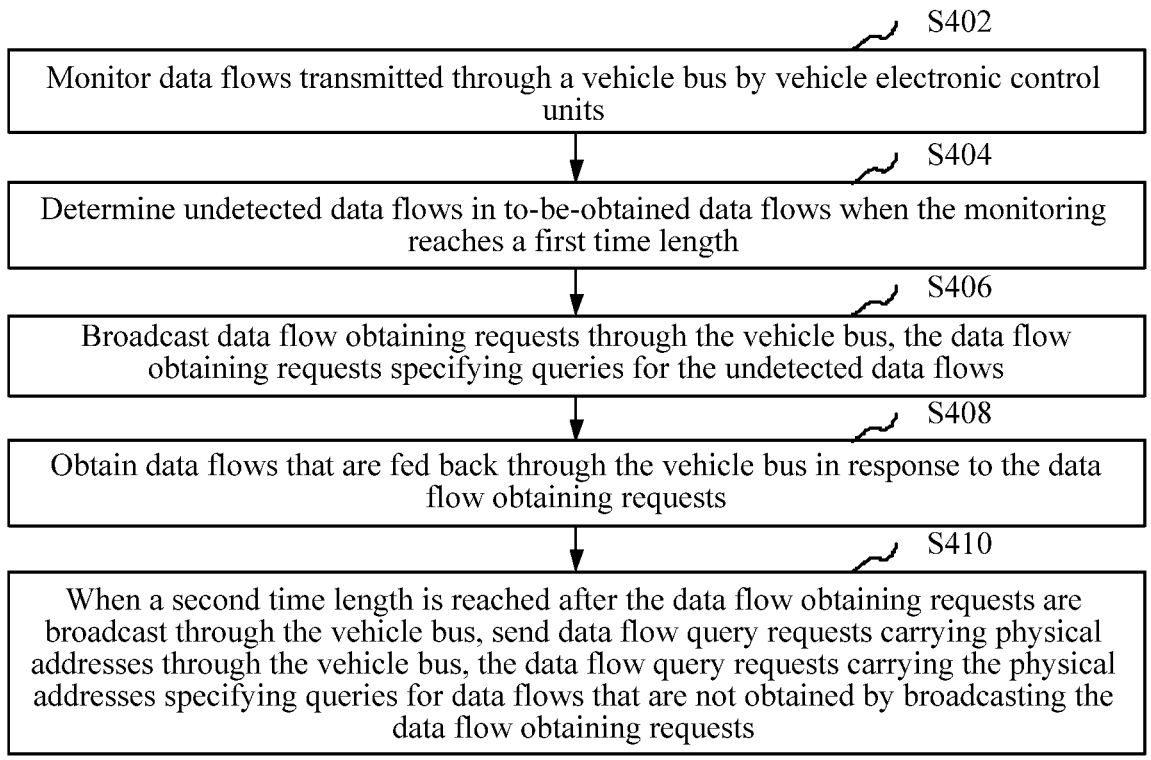
FIG. 4c is a schematic flowchart of a vehicle bus-based communication method according to another embodiment of the present invention.

FIG. 4c is a schematic flowchart of a vehicle bus-based communication method according to another embodiment of the present invention. This embodiment differs from the embodiment shown in FIG. 4a only in that: apart from all of steps S402 to S408 in the embodiment shown in FIG. 4a, step S410 is further added to the method provided in the embodiment shown in FIG. 4c. Specifically, Step S410: When a second time length is reached after the data flow obtaining requests are broadcast through the vehicle bus, send data flow query requests carrying physical addresses through the vehicle bus, the data flow query requests carrying the physical addresses specifying queries for data flows that are not obtained by broadcasting the data flow obtaining requests.

Figure 4D:
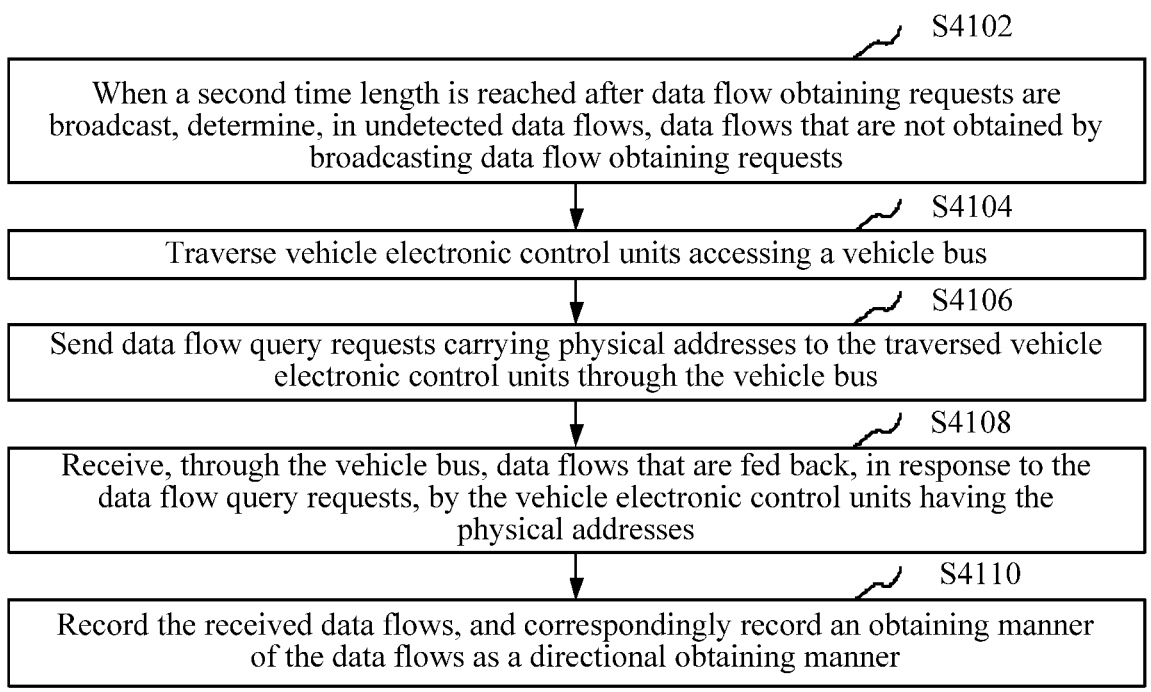
FIG. 4d is a schematic flowchart of a specific processing process of sending, through a vehicle bus, data flow query requests carrying physical addresses in step S410 in FIG. 4c.

Specifically, FIG. 4d is a schematic flowchart of a specific processing process of sending data flow query requests carrying physical addresses through a vehicle bus in step S410 in FIG. 4c. The specific processing process includes:

S4102. When a second time length is reached after the data flow obtaining requests are broadcast, determine, in the undetected data flows, data flows that are not obtained by broadcasting the data flow obtaining requests.

S4104. Traverse vehicle ECUs accessing the vehicle bus.

S4106. Send the data flow query requests carrying the physical addresses to the traversed vehicle ECUs through the vehicle bus.

S4108. Receive, through the vehicle bus, data flows that are fed back, in response to the data flow query requests, by the vehicle ECUs having the physical addresses.

S4110. Record the received data flows, and correspondingly record an obtaining manner of the data flows as a directional obtaining manner.

In the embodiment described above, the data flows that are still not obtained by broadcasting the data flow obtaining requests are first determined in the undetected data flows, data flow query requests are generated according to the determined data flows and corresponding physical addresses of the vehicle ECUs, and then the data flow query requests are sent through the vehicle bus, to obtain corresponding data flows, so that data flows of the vehicle can be completely obtained.

In an embodiment, in the vehicle bus-based communication method described above, the step of sending the data flow query requests through the vehicle bus includes: traversing vehicle ECUs accessing the vehicle bus; and sending the data flow query requests to the traversed vehicle ECUs through the vehicle bus.

Specifically, when determining the data flows that are not obtained, the diagnostic device determines the data flows that are not obtained in two manners including monitoring and broadcasting the data flow obtaining requests. For each of the determined data flows that are not obtained, corresponding data flow query requests are respectively sent to all the vehicle ECUs accessing the vehicle bus. The data flow query requests include the data flows that are not obtained and the physical addresses of corresponding vehicle ECUs.

In this embodiment, the data flow query requests corresponding to the data flows that are not obtained are traversed and sent to all the vehicle ECUs accessing the vehicle bus, to traverse and query for the data flows that are not obtained, thereby obtaining all data flows that can be obtained in the vehicle ECUs, and improving a coverage rate of obtaining data flows.

In an embodiment, in the vehicle bus-based communication method described above, for the detected data flows, a corresponding obtaining manner is recorded as a monitoring-and-obtaining manner; for the data flows that are obtained by broadcasting the data flow obtaining requests, a corresponding obtaining manner is recorded as a broadcasting-and-obtaining manner; and for the data flows that are obtained by sending the data flow query requests carrying the physical addresses, a corresponding obtaining manner is recorded as a directional obtaining manner.

The obtaining manner is used for representing a path or a means for obtaining a data flow. The obtaining manner may specifically be at least one of a monitoring-and-obtaining manner, a broadcasting-and-obtaining manner, a directional obtaining manner or the like.

Specifically, the diagnostic device can obtain all the data flows in the vehicle ECUs in three manners including monitoring the vehicle bus, broadcasting data flow obtaining requests and sending data flow query requests carrying physical addresses. When obtaining a corresponding data flow in any of the three obtaining manners, the diagnostic device records the obtained data flow and the obtaining manner of the data flow.

Further, when obtaining, in a manner of monitoring the vehicle bus, a data flow that is actively sent by a vehicle ECU, the data flow is recorded, and the obtaining manner of the data flow is correspondingly recorded as the monitoring-and-obtaining manner. When obtaining a corresponding data flow in a manner of broadcasting the data flow obtaining requests through the vehicle bus, the diagnostic device records the data flow, and correspondingly records the obtaining manner of the data flow as the broadcasting-and-obtaining manner. When the diagnostic device obtains a corresponding data flow by sending the data flow query requests carrying corresponding physical addresses to the vehicle ECUs, the diagnostic device records the obtained data flow, and correspondingly records the obtaining manner of the data flow as the directional obtaining manner.

In the embodiment described above, data flows of all the vehicle ECUs accessing the vehicle bus are obtained in the three data flow obtaining manners, and corresponding data flow obtaining manners are recorded after the data flows are obtained, so that when the data flows are dynamically refreshed and displayed, corresponding data flow obtaining manners can be rapidly selected according to the recorded data flow obtaining manners, to improve corresponding data flow obtaining efficiency, thereby improving a speed for refreshing and displaying the data flows, and providing good user experience.

In an embodiment, in the vehicle bus-based communication method described above, an instruction for refreshing and displaying a data flow is obtained; a corresponding recorded obtaining manner of the data flow specified by the instruction for refreshing and displaying a data flow is obtained; the data flow specified by the instruction for refreshing and displaying a data flow is re-obtained in the corresponding recorded obtaining manner; and the re-obtained data flow is displayed.

The instruction is an instruction for triggering the diagnostic device to refresh and display a data flow. Specifically, the diagnostic device detects and obtains the instruction for refreshing and displaying a data flow; when obtaining the instruction for refreshing and displaying a data flow, queries for, according to a data flow specified by the obtained instruction refreshing and displaying a data flow, a recorded obtaining manner corresponding to the specified data flow; obtains, according to the obtaining manner found through querying, the data flow corresponding to the instruction for refreshing and displaying a data flow; and dynamically refreshes and displays the obtained data flow.

In an embodiment, the diagnostic device detects a trigger operation for refreshing and displaying a data flow, and generates a corresponding refreshing and displaying instruction when detecting the trigger operation, queries for a corresponding data flow obtaining manner according to the refreshing and displaying instruction, obtains a data flow according to the obtaining manner found through querying, and dynamically refreshes and displays the data flow.

In the embodiment described above, the diagnostic device queries for, according to the data flow specified by the instruction, an obtaining manner that is recorded in correspondence to the data flow; obtains a corresponding data flow in the obtaining manner found through querying; and performs dynamic refreshing and displaying, to improve a speed of the diagnostic device for obtaining the corresponding data flow according to the instruction, and efficiency of dynamically refreshing and displaying the data flow, thereby improving a speed of the diagnostic device for communicating with a vehicle ECU through the vehicle bus.

Figure 5:
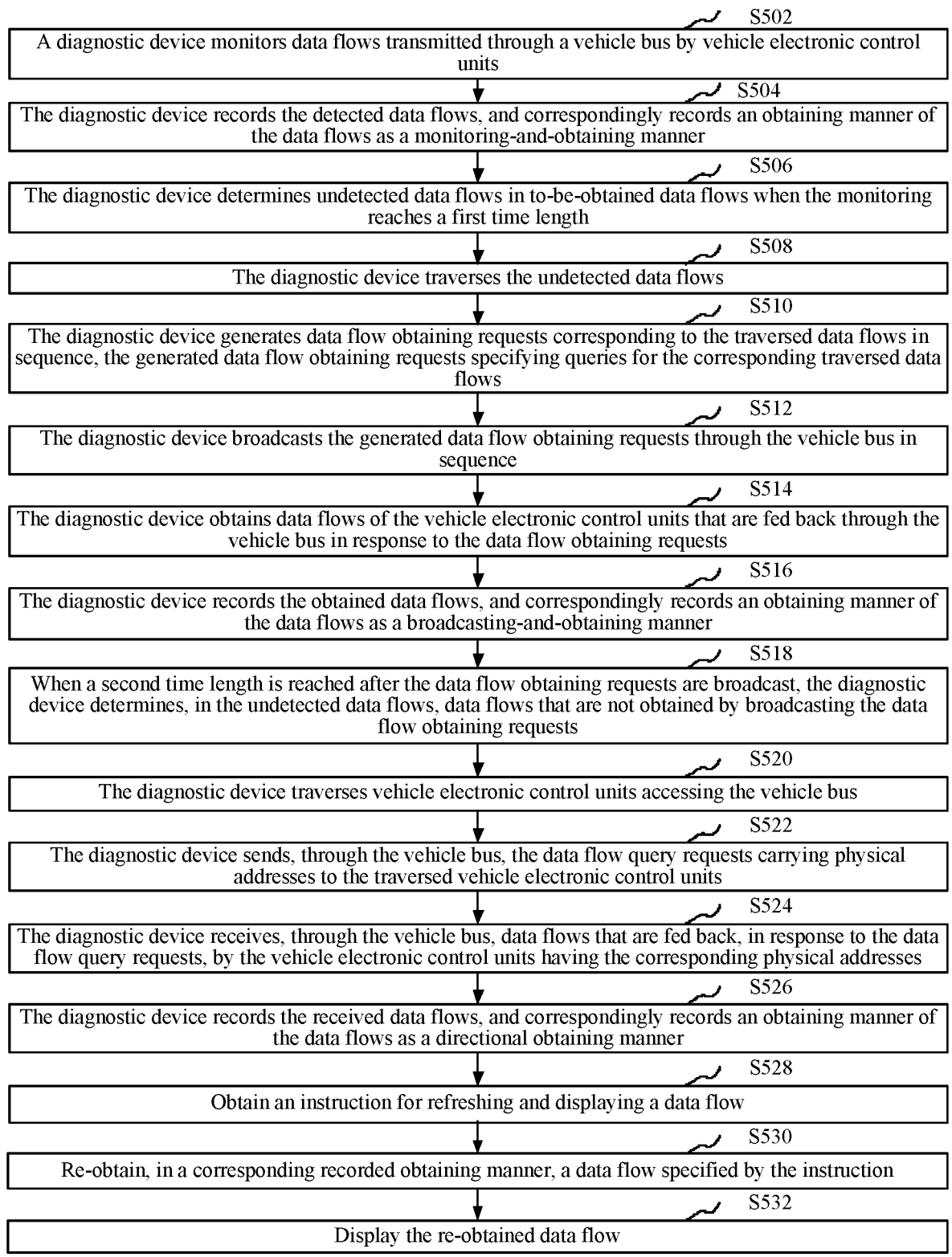
FIG. 5 is a schematic flowchart of a vehicle bus-based communication method according to another embodiment of the present invention.

As shown in FIG. 5, in a specific embodiment, the vehicle bus-based communication method includes the following steps:

S502. A diagnostic device monitors data flows transmitted through a vehicle bus by vehicle ECUs.

S504. The diagnostic device records the detected data flows, and correspondingly records an obtaining manner of the data flows as a monitoring-and-obtaining manner.

S506. The diagnostic device determines undetected data flows in to-be-obtained data flows when the monitoring reaches a first time length.

S508. The diagnostic device traverses the undetected data flows.

S510. The diagnostic device generates data flow obtaining requests corresponding to the traversed data flows in sequence, the generated data flow obtaining requests specifying queries for the corresponding traversed data flows.

S512. The diagnostic device broadcasts the generated data flow obtaining requests through the vehicle bus in sequence.

S514. The diagnostic device obtains data flows of the vehicle ECUs that are fed back through the vehicle bus in response to the data flow obtaining requests.

S516. The diagnostic device records the obtained data flows, and correspondingly records an obtaining manner of the data flows as a broadcasting-and-obtaining manner.

S518. When a second time length is reached after the data flow obtaining requests are broadcast through the vehicle bus, the diagnostic device determines, in the undetected data flows, data flows that are not obtained when the data flow obtaining requests are broadcast through the vehicle bus.

S520. The diagnostic device traverses vehicle ECUs accessing the vehicle bus.

S522. The diagnostic device sends, through the vehicle bus, the data flow query requests carrying physical addresses to the traversed vehicle ECUs.

S524. The diagnostic device receives, through the vehicle bus, data flows that are fed back, in response to the data flow query requests, by the vehicle ECUs having the corresponding physical addresses.

S526. The diagnostic device records the received data flows, and correspondingly records an obtaining manner of the data flows as a directional obtaining manner.

S528. Obtain an instruction for refreshing and displaying a data flow.

S530. Re-obtain, in a corresponding recorded obtaining manner, a data flow specified by the instruction.

S532. Display the re-obtained data flow.

In the embodiment described above, the diagnostic device effectively resolves current problems that data flows obtained by a diagnostic device are not complete and that refreshing and displaying of the data flows are slow in a manner of combining monitoring a vehicle bus, sending data flow obtaining requests to vehicle ECUs through the vehicle bus and sending data flow query requests carrying physical addresses through the vehicle bus. All data flows of the vehicle ECUs accessing the vehicle bus can be completely obtained in the three obtaining manners described above. When a data flow needs to be refreshed and displayed, refreshing and displaying of the corresponding data flow can be rapidly implemented, to improve efficiency in refreshing and displaying the data flow, thereby improving communication efficiency between the diagnostic device and the vehicle ECUs.

Figure 6:
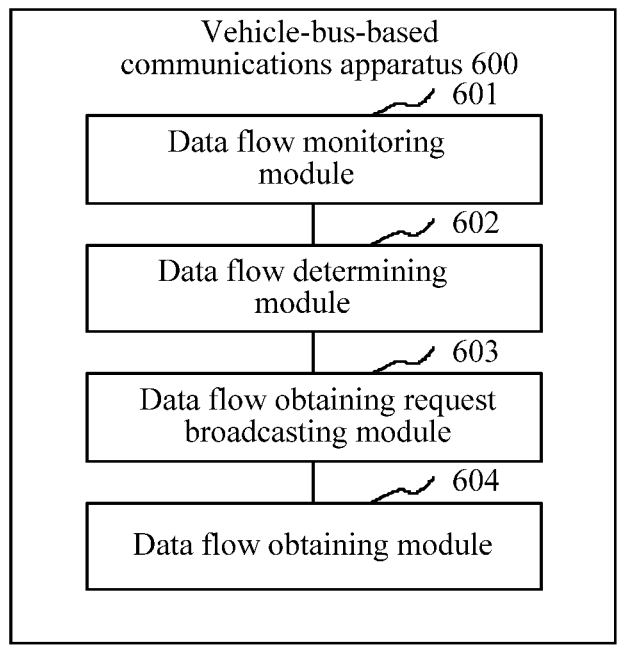
FIG. 6 is a structural block diagram of a vehicle bus-based communications apparatus according to an embodiment of the present invention.

As shown in FIG. 6, in an embodiment, a vehicle bus-based communications apparatus 600 is provided. Referring to FIG. 6, the vehicle bus-based communications apparatus 600 includes: a data flow monitoring module 601, a data flow determining module 602, a data flow obtaining request broadcasting module 603 and a data flow obtaining module 604.

The data flow monitoring module 601 is configured to monitor data flows transmitted through a vehicle bus by vehicle ECUs.

The data flow determining module 602 is configured to determine undetected data flows in to-be-obtained data flows when the monitoring reaches a first time length.

The data flow obtaining request broadcasting module 603 is configured to broadcast data flow obtaining requests through the vehicle bus, the data flow obtaining requests specifying queries for the undetected data flows.

The data flow obtaining module 604 is configured to obtain data flows that are fed back through the vehicle bus in response to the data flow obtaining requests.

In the vehicle bus-based communications apparatus described above, when data flows of a vehicle are obtained through a vehicle bus, data flows on the vehicle bus are first obtained in a monitoring manner, thereby ensuring data flow obtaining efficiency. After the monitoring is performed for a period of time, data flows that are not obtained in a monitoring-and-obtaining manner are obtained by sending corresponding data flow obtaining requests to the vehicle bus, so that it is ensured that relatively more complete data flows of the vehicle can be obtained.

Figure 7:
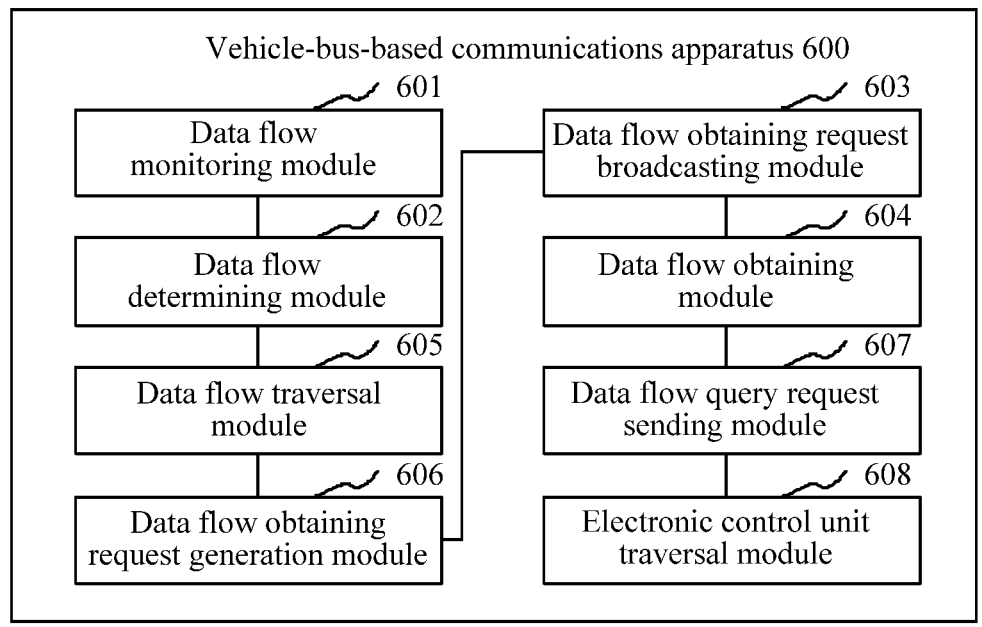
FIG. 7 is a structural block diagram of a vehicle bus-based communications apparatus according to another embodiment of the present invention.

As shown in FIG. 7, in an embodiment, the vehicle bus-based communications apparatus 600 further includes: a data flow traversal module 605 and a data flow obtaining request generation module 606.

The data flow traversal module 605 is configured to traverse the undetected data flows.

The data flow obtaining request generation module 606 is configured to generate data flow obtaining requests corresponding to the traversed data flows in sequence, the generated data flow obtaining requests specifying queries for the corresponding traversed data flows.

The data flow obtaining request broadcasting module 603 is further configured to broadcast the generated data flow obtaining requests through the vehicle bus in sequence.

In the embodiment described above, corresponding data flow obtaining requests are generated respectively for all the undetected data flows, the generated data flow obtaining requests being broadcast through the vehicle bus, so that the vehicle ECUs respond to the obtained data flow obtaining requests. More complete data flows can be obtained by actively broadcasting the data flow obtaining requests.

In an embodiment, the vehicle bus-based communications apparatus 600 further includes: a data flow query request sending module 607.

The data flow determining module 602 is further configured to: when a second time length is reached after the data flow obtaining requests are broadcast through the vehicle bus, determine, in the undetected data flows, data flows that are not obtained when the data flow obtaining requests are broadcast through the vehicle bus.

The data flow query request sending module 607 is configured to send data flow query requests through the vehicle bus, the data flow query requests carrying physical addresses of vehicle ECUs corresponding to the data flows that are not obtained.

The data flow obtaining module 604 is further configured to receive data flows through the vehicle bus, the received data flows being fed back, in response to the data flow query requests, by the vehicle ECUs having the physical addresses.

In the embodiment described above, the data flows that are still not obtained by broadcasting the data flow obtaining requests are first determined in the undetected data flows, data flow query requests are generated according to the determined data flows and corresponding physical addresses of the vehicle ECUs, and then the data flow query requests are sent through the vehicle bus, to obtain corresponding data flows, so that data flows of the vehicle can be completely obtained.

In an embodiment, the vehicle bus-based communications apparatus 600 further includes: an ECU traversal module 608.

The ECU traversal module 608 is configured to traverse vehicle ECUs accessing the vehicle bus.

The data flow query request sending module 607 is further configured to send the data flow query requests to the traversed vehicle ECUs through the vehicle bus.

In this embodiment, the data flow query requests corresponding to the data flows that are not obtained are traversed and sent to all the vehicle ECUs accessing the vehicle bus, to traverse and query for the data flows that are not obtained, thereby obtaining all data flows that can be obtained in the vehicle ECUs, and improving a coverage rate of obtaining data flows.

Figure 8:
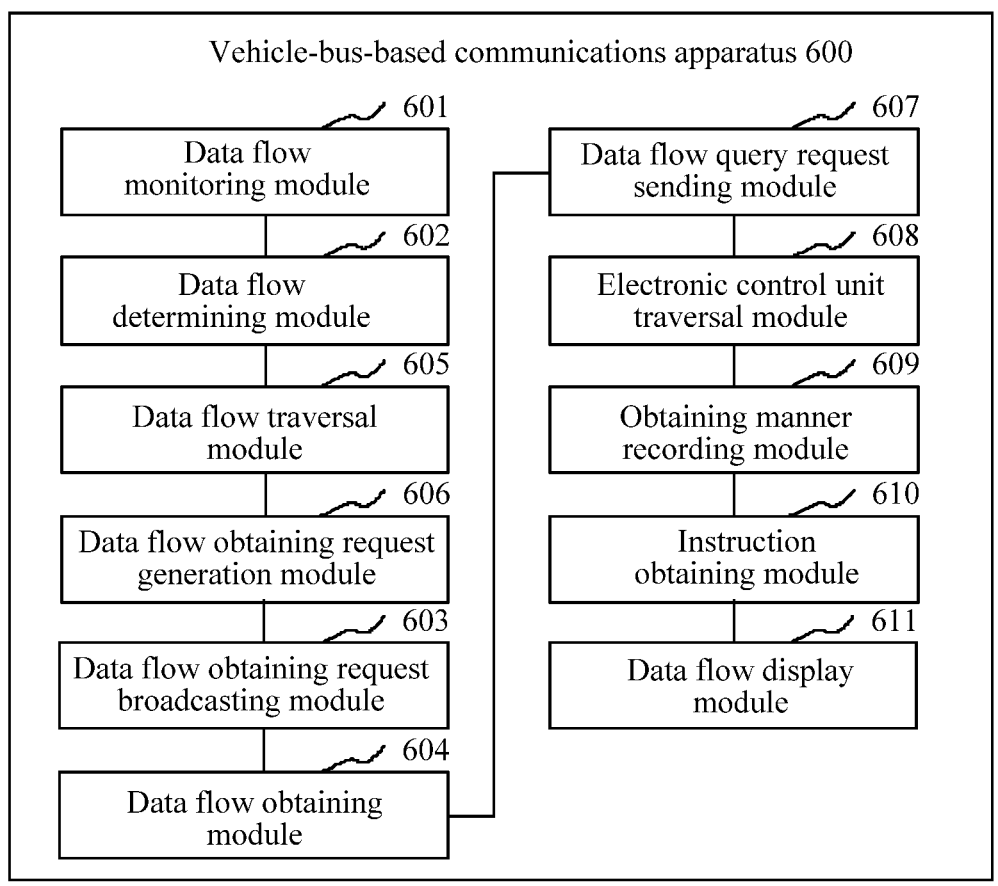
FIG. 8 is a structural block diagram of a vehicle bus-based communications apparatus according to an embodiment of the present invention.

As shown in FIG. 8, in an embodiment, the vehicle bus-based communications apparatus 600 further includes: an obtaining manner recording module 609.

The obtaining manner recording module 609 is configured to record a corresponding obtaining manner as a monitoring-and-obtaining manner for the detected data flows; further configured to record a corresponding obtaining manner as a broadcasting-and-obtaining manner for the data flows that are obtained by broadcasting the data flow obtaining requests; and further configured to record a corresponding obtaining manner as a directional obtaining manner for the data flows that are obtained by sending the data flow query requests carrying the physical addresses.

In the embodiment described above, data flows of all the vehicle ECUs accessing the vehicle bus are obtained in the three data flow obtaining manners, and corresponding data flow obtaining manners are recorded after the data flows are obtained, so that when the data flows are dynamically refreshed and displayed, corresponding data flow obtaining manners can be rapidly selected according to the recorded data flow obtaining manners, to improve corresponding data flow obtaining efficiency, thereby improving a speed for refreshing and displaying the data flows, and providing good user experience.

In an embodiment, the vehicle bus-based communications apparatus 600 further includes:

an instruction obtaining module 610 and a data flow display module 611.

The instruction obtaining module 610 is configured to obtain an instruction for refreshing and displaying a data flow.

The data flow obtaining module 604 is further configured to obtain a corresponding recorded obtaining manner of a data flow specified by the instruction for refreshing and displaying a data flow; and further configured to re-obtain, in the corresponding recorded obtaining manner, the data flow specified by the instruction for refreshing and displaying a data flow.

The data flow display module 611 is configured to display the re-obtained data flow.

In the embodiment described above, the diagnostic device queries for, according to the data flow specified by the instruction, an obtaining manner that is recorded in correspondence to the data flow; obtains a corresponding data flow in the obtaining manner found through querying; and performs dynamic refreshing and displaying, to improve a speed of the diagnostic device for obtaining the corresponding data flow according to the instruction, and efficiency of dynamically refreshing and displaying the data flow, thereby improving a speed of the diagnostic device for communicating with a vehicle ECU through the vehicle bus.

A computer device is provided. The computer device may be the diagnostic device described above. The computer device includes a memory and a processor. The memory stores a computer program, the computer program, when executed by the processor, causing the processor to perform the following steps: monitoring data flows transmitted through a vehicle bus by vehicle ECUs; determining undetected data flows in to-be-obtained data flows when the monitoring reaches a first time length; broadcasting data flow obtaining requests through the vehicle bus, the data flow obtaining requests specifying queries for the undetected data flows; and obtaining data flows that are fed back through the vehicle bus in response to the data flow obtaining requests.

In an embodiment, the broadcasting data flow obtaining requests through the vehicle bus includes: traversing the undetected data flows; generating data flow obtaining requests corresponding to the traversed data flows in sequence, the generated data flow obtaining requests specifying queries for the corresponding traversed data flows; and broadcasting the generated data flow obtaining requests through the vehicle bus in sequence.

In an embodiment, when executed by the processor, the computer program causes the processor to perform the following steps: when a second time length is reached after the data flow obtaining requests are broadcast through the vehicle bus, determining, in the undetected data flows, data flows that are not obtained when the data flow obtaining requests are broadcast through the vehicle bus; sending data flow query requests through the vehicle bus, the data flow query requests carrying physical addresses of vehicle ECUs corresponding to the data flows that are not obtained; and receiving data flows through the vehicle bus, the received data flows being fed back, in response to the data flow query requests, by the vehicle ECUs having the physical addresses.

In an embodiment, the sending the data flow query requests through the vehicle bus includes: traversing vehicle ECUs accessing the vehicle bus; and sending the data flow query requests to the traversed vehicle ECUs through the vehicle bus.

In an embodiment, when executed by the processor, the computer program causes the processor to perform the following steps: recording a corresponding obtaining manner as a monitoring-and-obtaining manner for the detected data flows; recording a corresponding obtaining manner as a broadcasting-and-obtaining manner for the data flows that are obtained by broadcasting the data flow obtaining requests; and recording a corresponding obtaining manner as a directional obtaining manner for the data flows that are obtained by sending the data flow query requests carrying the physical addresses.

In an embodiment, when executed by the processor, the computer program causes the processor to perform the following steps: obtaining an instruction for refreshing and displaying a data flow; obtaining a corresponding recorded obtaining manner of a data flow specified by the instruction for refreshing and displaying a data flow; re-obtaining, in the corresponding recorded obtaining manner, the data flow specified by the instruction for refreshing and displaying a data flow; and displaying the re-obtained data flow.

When obtaining the data flows of a vehicle through the vehicle bus, the computer device described above first obtains data flows on the vehicle bus in a monitoring manner, thereby ensuring data flow obtaining efficiency. After the monitoring is performed for a period of time, data flows that are not obtained in a monitoring-and-obtaining manner are obtained by sending corresponding data flow obtaining requests to the vehicle bus, so that it is ensured that relatively more complete data flows of the vehicle can be obtained.

A computer-readable storage medium is provided, storing a computer program, the computer program, when executed by a processor, causing the processor to perform the following steps: monitoring data flows transmitted through a vehicle bus by vehicle ECUs; determining undetected data flows in to-be-obtained data flows when the monitoring reaches a first time length; broadcasting data flow obtaining requests through the vehicle bus, the data flow obtaining requests specifying queries for the undetected data flows; and obtaining data flows that are fed back through the vehicle bus in response to the data flow obtaining requests.

In an embodiment, the broadcasting data flow obtaining requests through the vehicle bus includes: traversing the undetected data flows; generating data flow obtaining requests corresponding to the traversed data flows in sequence, the generated data flow obtaining requests specifying queries for the corresponding traversed data flows; and broadcasting the generated data flow obtaining requests through the vehicle bus in sequence.

In an embodiment, when executed by the processor, the computer program causes the processor to perform the following steps: when a second time length is reached after the data flow obtaining requests are broadcast through the vehicle bus, determining, in the undetected data flows, data flows that are not obtained when the data flow obtaining requests are broadcast through the vehicle bus; sending data flow query requests through the vehicle bus, the data flow query requests carrying physical addresses of vehicle ECUs corresponding to the data flows that are not obtained; and receiving data flows through the vehicle bus, the received data flows being fed back, in response to the data flow query requests, by the vehicle ECUs having the physical addresses.

In an embodiment, the sending the data flow query requests through the vehicle bus includes: traversing vehicle ECUs accessing the vehicle bus; and sending the data flow query requests to the traversed vehicle ECUs through the vehicle bus.

In an embodiment, when executed by the processor, the computer program causes the processor to perform the following steps: recording a corresponding obtaining manner as a monitoring-and-obtaining manner for the detected data flows; recording a corresponding obtaining manner as a broadcasting-and-obtaining manner for the data flows that are obtained by broadcasting the data flow obtaining requests; and recording a corresponding obtaining manner as a directional obtaining manner for the data flows that are obtained by sending the data flow query requests carrying the physical addresses.

In an embodiment, when executed by the processor, the computer program causes the processor to perform the following steps: obtaining an instruction for refreshing and displaying a data flow; obtaining a corresponding recorded obtaining manner of a data flow specified by the instruction for refreshing and displaying a data flow; re-obtaining, in the corresponding recorded obtaining manner, the data flow specified by the instruction for refreshing and displaying a data flow; and displaying the re-obtained data flow.

When obtaining the data flows of a vehicle through the vehicle bus, the computer-readable storage medium described above first obtains data flows on the vehicle bus in a monitoring manner, thereby ensuring data flow obtaining efficiency. After the monitoring is performed for a period of time, data flows that are not obtained in a monitoring-and-obtaining manner are obtained by sending corresponding data flow obtaining requests to the vehicle bus, so that it is ensured that relatively more complete data flows of the vehicle can be obtained.

A person of ordinary skill in the art may understand that all or some of the processes of the methods in the foregoing embodiments may be implemented by a computer program instructing relevant hardware. The program may be stored in a non-volatile computer-readable storage medium. When the program is run, the procedures of the foregoing method embodiments are performed. Any reference to a memory, storage, database or another medium used in the various embodiments provided in the present invention may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. By way of illustration and not limitation, the RAM is available in a variety of forms such as a static RAM (SRAM), a dynamic RAM (DRAM), a synchronous DRAM (SDRAM), a dual data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), a Rambus dynamic RAM (RDRAM) and the like.

The steps in the foregoing method embodiments are not limited in a performing sequence and may be randomly adjusted. To make descriptions concise, not all possible combinations of the steps in the foregoing method embodiments are described. However, all the combinations of these steps shall be considered as falling within the scope recorded by this specification provided that no conflict exists.

Although the device in the foregoing method embodiments is a diagnostic device, any device using this method shall be considered as an alternative solution of the diagnostic device recorded by this specification.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of the present invention and are described in detail, but they should not be construed as a limitation to the patent scope of the present invention. It should be noted that, a person of ordinary skill in the art may make various changes and improvements without departing from the idea of the present invention, which shall fall within the protection scope of the present invention. Therefore, the protection scope of the patent of the present invention shall be subject to the appended claims.

What is claimed is:

1. A vehicle bus-based communication method, comprising:
    monitoring a vehicle bus of a vehicle in a monitoring manner, and detecting data flows transmitted through the vehicle bus by vehicle electronic control units;
    determining undetected data flows in to-be-obtained data flows when the monitoring reaches a first time length;
    broadcasting data flow obtaining requests through the vehicle bus to obtain data flows in a broadcasting manner, the data flow obtaining requests specifying queries for the undetected data flows;
    sending data flow query requests carrying the physical addresses to obtain data flows in a directional obtaining manner; and
    obtaining data flows that are fed back through the vehicle bus in response to the data flow obtaining requests.

2. The method according to claim 1, wherein the broadcasting data flow obtaining requests through the vehicle bus comprises:
    traversing the undetected data flows;
    generating data flow obtaining requests corresponding to the traversed data flows in sequence, the generated data flow obtaining requests specifying queries for the corresponding traversed data flows; and
    broadcasting the generated data flow obtaining requests through the vehicle bus in sequence.

3. The method according to claim 1, further comprising:
    when a second time length is reached after the data flow obtaining requests are broadcast through the vehicle bus, determining, in the undetected data flows, data flows that are not obtained when the data flow obtaining requests are broadcast through the vehicle bus;
    sending the data flow query requests through the vehicle bus, the data flow query requests carrying physical addresses of vehicle electronic control units corresponding to the data flows that are not obtained; and
    receiving data flows through the vehicle bus, the received data flows being fed back, in response to the data flow query requests, by the vehicle electronic control units having the physical addresses.

4. The method according to claim 3, wherein the sending the data flow query requests through the vehicle bus comprises:

traversing vehicle electronic control units accessing the vehicle bus; and sending the data flow query requests to the traversed vehicle electronic control units through the vehicle bus.

5. The method according to claim 3, further comprising:
obtaining an instruction for refreshing and displaying a data flow;
obtaining a corresponding obtaining manner of a data flow specified by the instruction for refreshing and displaying a data flow;
re-obtaining, in the corresponding obtaining manner, the data flow specified by the instruction for refreshing and displaying a data flow; and
displaying the re-obtained data flow.

6. A computer device, comprising a memory and a processor, the memory storing a computer program, the computer program, when executed by the processor, causing the processor to:
monitor a vehicle bus of a vehicle in a monitoring manner, and detect data flows transmitted through the vehicle bus by vehicle electronic control units;
determine undetected data flows in to-be-obtained data flows when the monitoring reaches a first time length;
broadcast data flow obtaining requests through the vehicle bus to obtain data flows in a broadcasting manner, the data flow obtaining requests specifying queries for the undetected data flows;
sending data flow query requests carrying the physical addresses to obtain data flows in a directional obtaining manner; and
obtain data flows that are fed back through the vehicle bus in response to the data flow obtaining requests.

7. The computer device according to claim 6, wherein the processor is caused to broadcast data flow obtaining requests through the vehicle bus comprises:
the processor is caused to traverse the undetected data flows;
generate data flow obtaining requests corresponding to the traversed data flows in sequence, the generated data flow obtaining requests specifying queries for the corresponding traversed data flows; and
broadcast the generated data flow obtaining requests through the vehicle bus in sequence.

8. The computer device according to claim 6, wherein the processor is further configured to:
when a second time length is reached after the data flow obtaining requests are broadcast through the vehicle bus, determine, in the undetected data flows, data flows that are not obtained when the data flow obtaining requests are broadcast through the vehicle bus;
send the data flow query requests through the vehicle bus, the data flow query requests carrying physical addresses of vehicle electronic control units corresponding to the data flows that are not obtained; and
receive data flows through the vehicle bus, the received data flows being fed back, in response to the data flow query requests, by the vehicle electronic control units having the physical addresses.

9. The computer device according to claim 8, wherein the processor is caused to send the data flow query requests through the vehicle bus comprises:
the processor is caused to traverse vehicle electronic control units accessing the vehicle bus; and
send the data flow query requests to the traversed vehicle electronic control units through the vehicle bus.

10. The computer device according to claim 8, wherein the processor is further configured to:

obtain an instruction for refreshing and displaying a data flow;
obtain a corresponding obtaining manner of a data flow specified by the instruction for refreshing and displaying a data flow;
re-obtain, in the corresponding obtaining manner, the data flow specified by the instruction for refreshing and displaying a data flow; and
display the re-obtained data flow.

11. A non-transitory computer-readable storage medium, storing a computer program, the computer program, when executed by the processor, causing the processor to:
monitor a vehicle bus of a vehicle in a monitoring manner, and detect data flows transmitted through the vehicle bus by vehicle electronic control units;
determine undetected data flows in to-be-obtained data flows when the monitoring reaches a first time length;
broadcast data flow obtaining requests through the vehicle bus to obtain data flows in a broadcasting manner, the data flow obtaining requests specifying queries for the undetected data flows;
sending data flow query requests carrying the physical addresses to obtain data flows in a directional obtaining manner; and
obtain data flows that are fed back through the vehicle bus in response to the data flow obtaining requests.

12. The non-transitory computer-readable storage medium according to claim 11, wherein the processor is caused to broadcast data flow obtaining requests through the vehicle bus comprises:
the processor is caused to traverse the undetected data flows;
generate data flow obtaining requests corresponding to the traversed data flows in sequence, the generated data flow obtaining requests specifying queries for the corresponding traversed data flows; and
broadcast the generated data flow obtaining requests through the vehicle bus in sequence.

13. The non-transitory computer-readable storage medium according to claim 11, wherein the processor is further configured to:
when a second time length is reached after the data flow obtaining requests are broadcast through the vehicle bus, determine, in the undetected data flows, data flows that are not obtained when the data flow obtaining requests are broadcast through the vehicle bus;
send the data flow query requests through the vehicle bus, the data flow query requests carrying physical addresses of vehicle electronic control units corresponding to the data flows that are not obtained; and
receive data flows through the vehicle bus, the received data flows being fed back, in response to the data flow query requests, by the vehicle electronic control units having the physical addresses.

14. The non-transitory computer-readable storage medium according to claim 13, wherein the processor is caused to send the data flow query requests through the vehicle bus comprises:
the processor is caused to traverse vehicle electronic control units accessing the vehicle bus; and
send the data flow query requests to the traversed vehicle electronic control units through the vehicle bus.

15. The non-transitory computer-readable storage medium according to claim 13, wherein the processor is further configured to:
obtain an instruction for refreshing and displaying a data flow;

obtain a corresponding obtaining manner of a data flow specified by the instruction for refreshing and displaying a data flow;

re-obtain, in the corresponding obtaining manner, the data flow specified by the instruction for refreshing and displaying a data flow; and display the re-obtained data flow.

\* \* \* \* \*